Oct. 13, 1942.  R. C. RUSSELL  2,298,649
HYDRAULIC TRANSMISSION
Filed May 5, 1941  5 Sheets-Sheet 1

INVENTOR.
ROBERT C. RUSSELL
BY Kwis Hudson & Kent
ATTORNEYS

Oct. 13, 1942.  R. C. RUSSELL  2,298,649
HYDRAULIC TRANSMISSION
Filed May 5, 1941  5 Sheets-Sheet 2

INVENTOR.
ROBERT C. RUSSELL
BY
Kwis Hudson & Kent
ATTORNEYS

Oct. 13, 1942.  R. C. RUSSELL  2,298,649
HYDRAULIC TRANSMISSION
Filed May 5, 1941  5 Sheets-Sheet 3

INVENTOR.
ROBERT C. RUSSELL
BY Kwis Hudson & Kent
ATTORNEYS

INVENTOR.
ROBERT C. RUSSELL
BY Kwis Hudson & Kent
ATTORNEYS

Patented Oct. 13, 1942

2,298,649

UNITED STATES PATENT OFFICE 2,298,649

HYDRAULIC TRANSMISSION

Robert C. Russell, Cleveland, Ohio

Application May 5, 1941, Serial No. 391,951

25 Claims. (Cl. 74—189.5)

The present invention relates to power transmitting apparatus, including a fluid drive connection of the vane wheel type comprising a primary or impeller wheel and a secondary or turbine wheel, and more particularly to improvements in power transmitting apparatus of this character especially adapted for use in connection with motor-driven vehicles.

One of the principal objects of the present invention is the provision of novel and improved hydraulic power transmitting apparatus having three relatively rotatable vane members adapted to be operated either as a fluid torque converter or as a fluid coupling, and including means, comprising mechanism for automatically effecting a reversal of torque through said transmission, for changing from one to the other by connecting and disconnecting the vane member or wheel which constitutes the reaction member when the transmission is operated as a fluid torque converter to and from the driving member at least in part in response to or controlled by the speed of a driven member. Preferably the control means includes mechanism for varying the speed at which the change from fluid torque converter to fluid coupling and vice versa takes place in relation to the throttle opening when the transmission is used with an internal combustion engine.

Another object of the present invention is the provision of novel and improved power transmitting apparatus comprising a hydraulic power transmission adapted to be operated either as a fluid coupling or as a fluid torque converter and torque amplifying gearing, so constructed and arranged that when the hydraulic power transmission is operated as a fluid torque converter, the torque amplifying gearing is in series therewith, and when operated as a fluid coupling, the speed reduction between the driving and driven members of the power transmitting apparatus automatically approaches a one-to-one ratio as the speed of the secondary or turbine wheel approaches that of the primary or impeller wheel or wheels and including clutch means for selectively rendering the gearing inoperative to transmit torque.

Another object of the invention is the provision of a motor-driven vehicle comprising a power transmitting apparatus of the character referred to comprising novel and improved means for operatively disconnecting the secondary or turbine wheel from the drive shaft of the vehicle when the vehicle is at rest with the motor idling, so as to eliminate any tendency of the vehicle to creep or move forward, and to make gear shifting or engaging easy in the event a speed change or reverse gear transmission is employed.

Another object of the invention is the provision of power transmitting apparatus including a hydraulic transmission of the vane wheel type especially adapted for use in internal combustion motor-driven vehicles and which can be operated either as a fluid torque converter or as a fluid coupling, and which comprises novel and improved means for automatically changing the hydraulic transmission from one form to the other at a predetermined speed or speeds of one of the members of the transmission or of the vehicle, in combination, with means for varying the speed at which the change from fluid torque converter to fluid coupling and vice versa takes place in relation to the throttle opening of the engine of the vehicle.

The present invention resides in certain details of construction, and combinations and arrangements of parts and further objects and advantages will be apparent to those skilled in the art to which the invention relates from the following description of the preferred embodiment described with reference to the accompanying drawings forming a part of this specification in which similar reference characters designate corresponding parts and in which.

Figure 1:
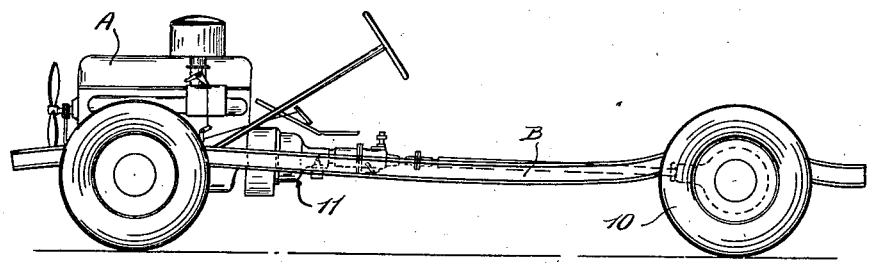
Fig. 1 is a diagrammatic view of an internal combustion motor-driven vehicle embodying the present invention.

Referring to the drawings, the reference character A designates an internal combustion engine of a motor-driven vehicle B shown diagrammatically in Fig. 1, adapted to be connected to and disconnected from the rear drive wheels 10 of the vehicle by means including power transmitting apparatus housed within a two-part transmission case 11, and including both a hydraulic transmission of the vane wheel type and a planetary gear transmission operatively connected together in a manner hereinafter fully described. The primary or impeller wheel C of the hydraulic transmission comprises a plurality of members 12, 13, and 14 suitably fixed together, the former of which is directly connected to the crankshaft 15 and has a semi-circular groove adjacent the periphery thereof within which groove a series of primary or impeller wheel vanes 16 are secured. The gear teeth 17 formed on the periphery of the member 12 are adapted to cooperate with the pinion of a conventional starting device for the motor A.

The secondary or turbine wheel of the hydraulic transmission is designated generally by the reference character D and comprises a plurality of blades 18 including radially spaced vanes 19 and 20 separated by a two-part ring-shaped tubular member 21 through which the blades 18 project and which assists in securing the blades in position. The radial outer ends of the turbine blades 18 are connected to an annular member or shroud ring 22 and the radial inner ends thereof to a two-part member 23 having the internal orbit gear 24 of a planetary gear transmission E formed integral therewith. The right-hand section 25 of the member 23, which section is connected to the left-hand part 26 by bolts 27, is rotatably supported on a tubular member or shaft 28, and the left-hand section 26 is rotatably supported on the hub of the spider member 29 of the planetary gear transmission E by a sleeve-like member 30 to which it is fixed in a suitable manner. The member 30 is in turn rotatably supported on the hub of the spider member. The spider member 29 of the planetary gear transmission is splined to the left-hand end of a driven shaft 31 which shaft is rotatably supported by bearings 32 and 33 in a hub formed on the member 12 and in a tubular member 34, respectively. The tubular member 34 is rotatably supported within the transmission case 11 by a bronze bushing 35 and a coil-type selective overrunning clutch F.

Figure 3:
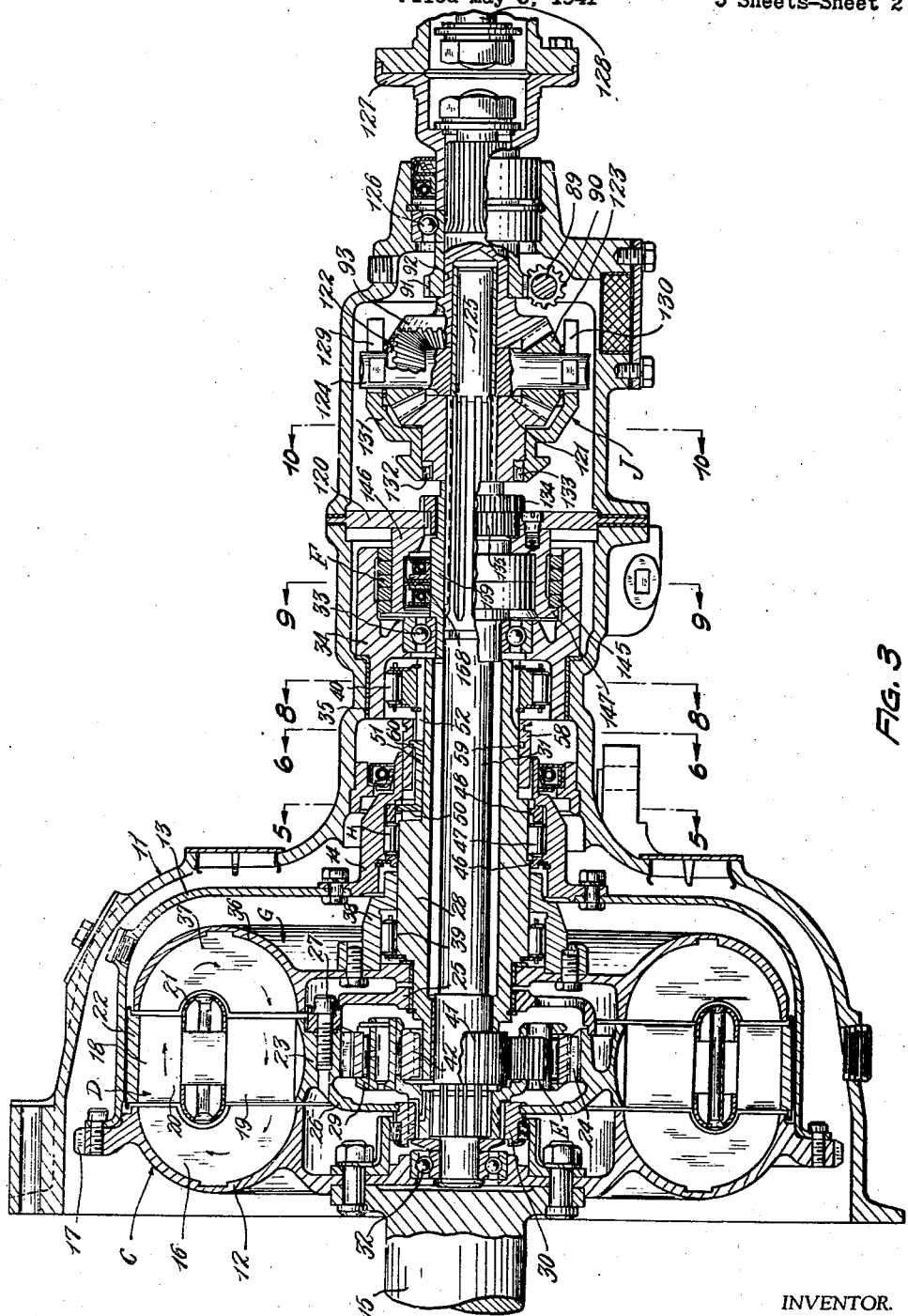
Fig. 3 is a vertical sectional view, with portions in elevation, through the power transmitting apparatus shown in Fig. 1.

The third element or vane wheel of the hydraulic transmission, designated generally by the reference character G, comprises a member 36 which, like the member 12, has a semi-circular annular groove adjacent to the periphery thereof within which a series of vanes 37 are secured in a suitable manner. When the hydraulic transmission is operated as a fluid torque converter, the member G constitutes the reaction member of the fluid torque converter and when the hydraulic transmission is operated as a fluid coupling, the member G is connected to the member 14 of the impeller wheel C and forms therewith the impeller or primary wheel of the fluid coupling. The member 36 is bolted to a member 38 rotatably supported on the tubular member or shaft 28 by an overrunning roller clutch 39 which permits rotation of the vane wheel G relative to the tubular shaft 28 in a forward direction, that is, in a clockwise direction as viewed from the left in Fig. 3, but prevents relative rotation between the two members in a reverse direction.

The tubular member or shaft 28 is in turn rotatably supported in the member 14 and member 34 by means including a selective-type overrunning clutch H and an overrunning roller clutch 40. The sun gear 41 of the planetary gear transmission E is formed on the left-hand end of the tubular member or shaft 28. When the hydraulic transmission is operating as a fluid torque converter, the overrunning roller clutch 40 prevents reverse rotation of the sun gear 41 under the reaction produced by the planet gears 42 carried by the spider member 29 which planet gears are then being rotated by the orbit gear 24 through the turbine wheel D, and also prevents backward rotation of the tubular shaft 28 under the influence of the vane wheel G due to the fluid reaction. The overrunning roller clutch 40, however, permits the tubular shaft 28 and, in turn, the vane wheel G and the sun gear 41 to be driven forward by the member 14 when the selective-type overrunning clutch H is engaged in both directions, in which event the hydraulic transmission operates as a fluid coupling.

As is well known in the art, fluid passing from the impeller wheel to the turbine wheel and to the reaction member of a fluid torque converter of the character here involved tends to drive the reaction member forward as the speed of the turbine wheel approaches that of the impeller wheel. In the present transmission, if this condition occurs prior to the time that the vane wheel G is connected to the impeller wheel C, the overrunning clutch 39 allows the vane wheel G to rotate forwardly without drag, thereby increasing the efficiency of the device. In the hydraulic transmission shown, the fluid circulates in the direction indicated by the arrows in Fig. 3 when the transmission is operated as a fluid torque converter.

Figures 4, 5:
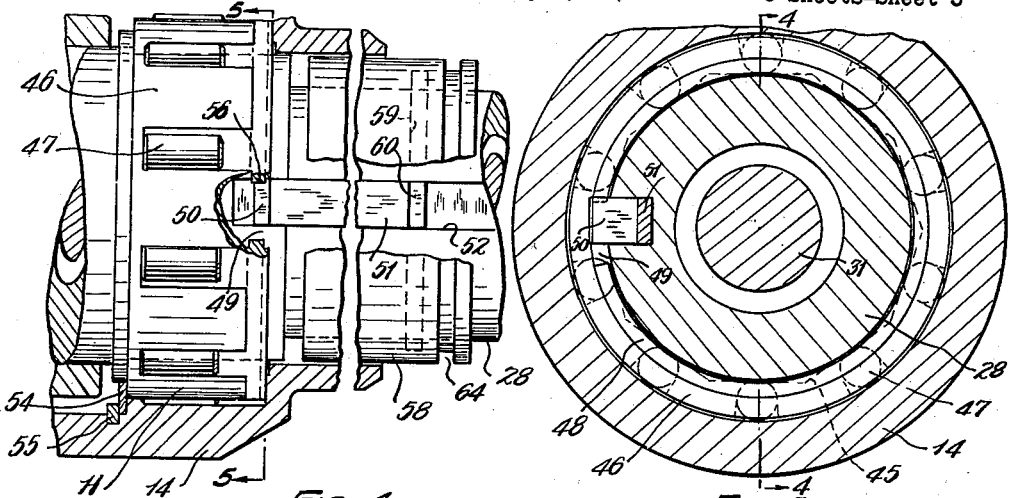
Fig. 4 is a sectional view, with portions in elevation and broken away, approximately on the line 4—4 of Fig. 5.
Fig. 5 is a sectional view approximately on the line 5—5 of Figs. 3 and 4.

The member 14 of the primary wheel includes an elongated hub through the medium of which it is rotatably supported on the tubular member or shaft 28 by the selective-type overrunning clutch H previously referred to. The operating cam surfaces 45 of the overrunning clutch H, see Fig. 5, are formed on the exterior of the shaft 28 and are of such construction that the clutch can engage in both directions. The cage 46 within which the rollers 47 of the clutch are held provides means for selectively preventing the clutch from engaging in one direction. The cage 46 is made in two parts suitably secured together and the rear end thereof is provided with an inwardly projecting annular flange 48 having a slot 49 within which a projection 50 on a key 51 slidably supported in a groove 52 in the exterior of the tubular shaft 28 engages when the key is in its rear position, which is the position shown in Figs. 3 and 4. When the key is in this position the projection 50 limits the movement of the cage 46 in a clockwise direction as viewed from the left in Figs. 3 and 4 (counterclockwise as viewed in Fig. 5) to a position such that the rollers 47 cannot move past the central or disengaged position, thus allowing the member 14 to overrun the shaft 28 in a clockwise direction (counterclockwise as viewed in Fig. 5) but not in the opposite direction. The slot 49 in the annular flange 48 is elongated on the lower side, as viewed in Figs. 4 and 5, from which it will be apparent that the cage can move in a counterclockwise direction as viewed from the left in Fig. 3 (clockwise as viewed in Fig. 5) even though the key 51 is in its rear position.

When the key 51 is shifted to its front position, the upper end of the projection 50 extends into the interior of the cage 46 and is clear of the flange 48. With the key in this position the cage 46 is free to move in either direction, thus allowing the clutch H to engage in either direction. When the key 51 is in the rear position, the member 14 and in turn the primary wheel C can overrun the tubular shaft 28 in a clockwise direction as viewed from the left in Fig. 3, but, when the key 51 is in its forward position, it cannot. In the latter position the shaft 28 and in turn the vane wheel G are connected to and driven as a unit with the impeller wheel C. In other words, the hydraulic transmission then operates as a fluid coupling. In no event can the shaft 28 overrun the member 14 and the primary wheel C in a counterclockwise direction as viewed from the front. This fact permits the engine to be used as a brake for decelerating the vehicle irrespective of whether the hydraulic transmission is operating as a fluid torque converter or as a fluid coupling.

Provision is made for preventing the key 51 from being shifted from one position to the other while torque is being transmitted in the normal direction, that is, from the internal combustion engine to the driven shaft 31, etc. When the key 51 is in the position shown in Fig. 4, the member 14 overruns the tubular shaft 28, and the cage 46 is caused to move in the direction in which the member 14 is moving by a spring washer 54 interposed between the shoulder formed on the member 14 and a ring 55 fixed thereto. The inner portion of the spring washer 54 frictionally engages the left-hand end of the cage 46 and causes the same to be carried along with the member 14. The upper end of the projection 50 of the key 51 is provided with a cut-out portion 56 forming a ledge or shoulder which engages the edge of the flange 48 of cage 46 at the top of the slot 49 as viewed in Figs. 4 and 5, thus preventing the key 51 from being shifted to its front position. Upon reversal of torque, the cage 46 is moved in the opposite direction moving the edge of the flange 48 clear of the shoulder on the key 51, permitting the same to be shifted into its front position. The key 51 is prevented from being moved in the opposite direction when the tubular shaft 28 is being driven by the member 14 by the engagement of the upper right-hand corner of the projection 50 of the key 51 as viewed in Fig. 4, with the edge of the flange 48 on the cage 46, but, upon a reversal of torque, the cage is shifted towards the top, releasing the key 51. When it is desired to shift the key from one position to another, an instantaneous reversal of torque is effected in a manner hereinafter described.

As shown, the key 51 is shifted from one position to the other by a sleeve-like member 58 slidably supported on the exterior of the tubular shaft 28 and provided with an internal groove 59 within which a radially extending projection 60 on the rear end of the key 51 projects. The sleeve 58 is adapted to be reciprocated on the tubular shaft 28 by a crank arm 61, see Fig. 6, formed integral with the lower end of the shaft 62 rotatably supported in a member 63 bolted to the transmission case 11, and provided with a crank pin 64 which continuously engages within an external groove 65 on the sleeve 58. The outer end of the shaft 62 carries a lever 66 through the medium of which it is connected to the plunger 67 of an electric solenoid 68 by a link 69 partly enclosed within a flexible boot 70 adapted to exclude dirt, etc. The electric solenoid 68 is fixed to and carried by the member 63.

The plunger 67 of the electric solenoid 68 is continuously urged in an outward direction by a compression spring 71 interposed between a housing 72 bolted to the solenoid and a cup-shaped member 73 fixed to the link 69. The plunger 67 is moved in the opposite direction upon energization of the solenoid 68. The solenoid 68 is in series circuit with a governor switch 74 having normally open contacts 75, 76 adapted to be closed upon the vehicle reaching a predetermined speed. The circuit preferably includes the ignition switch 77 of the automobile and a second manually operated switch 78 which, if desired, can be used to open the circuit to the solenoid 68 with the contacts 75, 76 of the governor switch 74 closed without stopping the motor.

Figure 6:
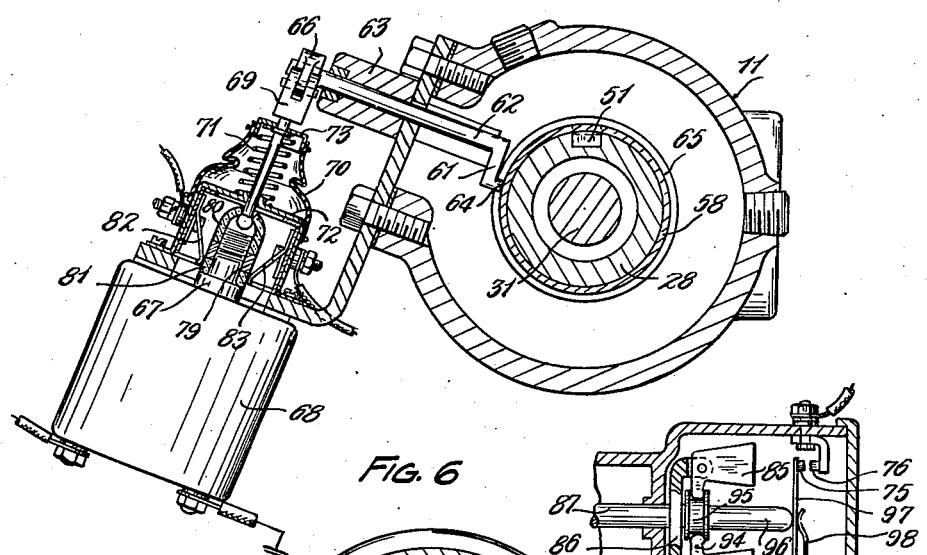
Fig. 6 is a sectional view, with portions in elevation, approximately on the line 6—6 of Fig. 3.

In the embodiment shown the primary circuit of the ignition circuit of the internal combustion engine is instaneously grounded to effect a reversal of torque through the power transmitting apparatus upon movement of the plunger 67 of the electric solenoid 68 in either direction. This is brought about by a ring 79 of conducting material, such as copper, secured to the projecting end of the plunger 67 intermediate two insulating members 80 and 81. Normally two brushes 82 and 83 carried by the housing 72 engage one or the other of the insulating members 80 and 81, depending upon which of its two normal positions the plunger 67 is occupying at any particular time. The left-hand brush 82, see Fig. 6, is connected to the ignition circuit of the automobile, and the right-hand brush 83 is connected to ground. As the plunger 67 moves from one of its two normal positions to the other, the brushes 82 and 83 instantaneously contact the conductor ring 79, causing a failure of the ignition circuit and effecting a reversal of torque in the power transmitting apparatus. As soon as the key 51 is released by the roller cage 46 as above explained, the plunger 67 continues its movement and again restores the ignition system to its original condition.

For the successful operation of the power transmitting apparatus of the present invention, it is not necessary that a reversal of torque be effected automatically as explained above, as a reversal of torque can be effected manually by closing the throttle of the internal combustion engine for a short period of time. Under these conditions the hydraulic transmission mechanism will not be changed from a fluid torque converter to a fluid coupling, and vice versa, upon the opening and closing of the contacts 75, 76 of the governor switch 74 but the change will be under the joint control of both the operator and the governor switch. In other words, the governor switch cannot convert the hydraulic transmission from one form to the other until the operator reverses the direction of torque through the transmission, nor can the operator convert the hydraulic transmission from one form to the other until the vehicle has reached a predetermined speed or has dropped below a predetermined speed. The objection to the latter form of operation is that, by keeping the throttle of the engine open, the operator will prevent the hydraulic transmission from changing from a fluid coupling to a hydraulic torque converter in ascending a hill or the like, irrespective of the speed of the vehicle. The manual switch 78 comprises means for opening the circuit to the electric solenoid 68 and changing the hydraulic transmission from a fluid coupling to a fluid torque converter at speeds above those at which the contacts 75, 76 of the governor switch 74 open. The switch 78 may or may not be employed, as desired.

Figure 7:
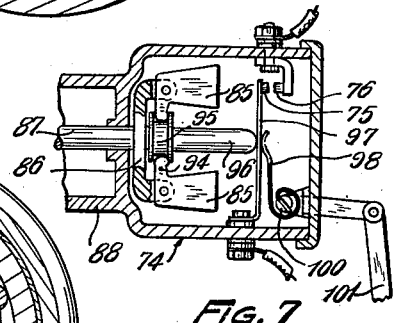
Fig. 7 is a sectional view, with portions in elevation, through the governor switch shown in Fig. 2.
Figure 8:
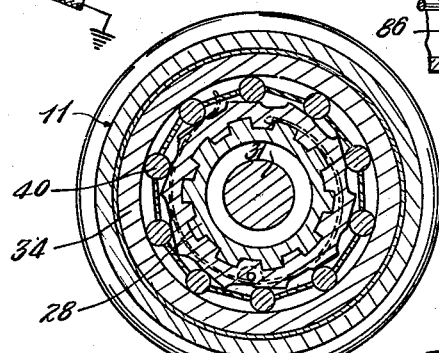
Fig. 8 is a sectional view, with portions in elevation, approximately on the line 8—8 of Fig. 3.

The governor switch 74 is of conventional construction and will not be herein described in detail. Suffice it to say that it comprises a plurality of weights 85 pivotally connected to a member 86 operatively connected to a shaft 87 rotatably supported in a housing 88 fixed to the transmission case 11 and operatively connected in a conventional manner with a shaft 89 provided with a gear 90 continuously in mesh with a gear 91 fixed to the hub 92 of a beveled side gear 93 of a planetary gear transmission J hereinafter more specifically referred to, which planetary gear transmission is adapted to form the reverse gear of the vehicle. The weights 85 of the governor switch 74 are provided with arms 94 which engage within a groove 95 in member 96 slidably supported on the right-hand end of the shaft 87. The free end of the member 96 engages a spring arm 97 which carries the movable contact 75. The spring arm 97 is fixed to the switch housing 88 and is continuously urged in a counterclockwise direction as viewed in Fig. 7 by a leaf spring 98 to maintain the contacts 75, 76 open. As the weights 85 move outwardly under centrifugal force, the member 96 is caused to move towards the right against the action of the spring 98, and upon the vehicle reaching a predetermined speed, the contacts 75, 76 close.

Preferably the speed of the vehicle at which the contacts 75, 76 of the governor switch 74 close is caused to vary as the throttle of the internal combustion engine is opened and closed. To this end, the end of the spring 98 other than the end which engages the contact arm 97 is fixed to a shaft 100 rotatably supported in the governor switch housing 88 and operatively connected by suitable linkage, designated generally by the reference character 101 to one arm 102 of a bell crank lever rotatably supported on the shaft 103 which carries the butterfly valve 104 of the carburetor 105 of the engine. The other arm 106 of the bell crank lever is operatively connected to the throttle controlling mechanism of the internal combustion engine, in the present instance a foot accelerator 107, by a rod 108. The linkage for connecting the various parts referred to is merely shown diagrammatically in the drawings but it is to be understood that any suitable linkage may be employed, depending upon the location of the various parts to be connected.

Figure 2:
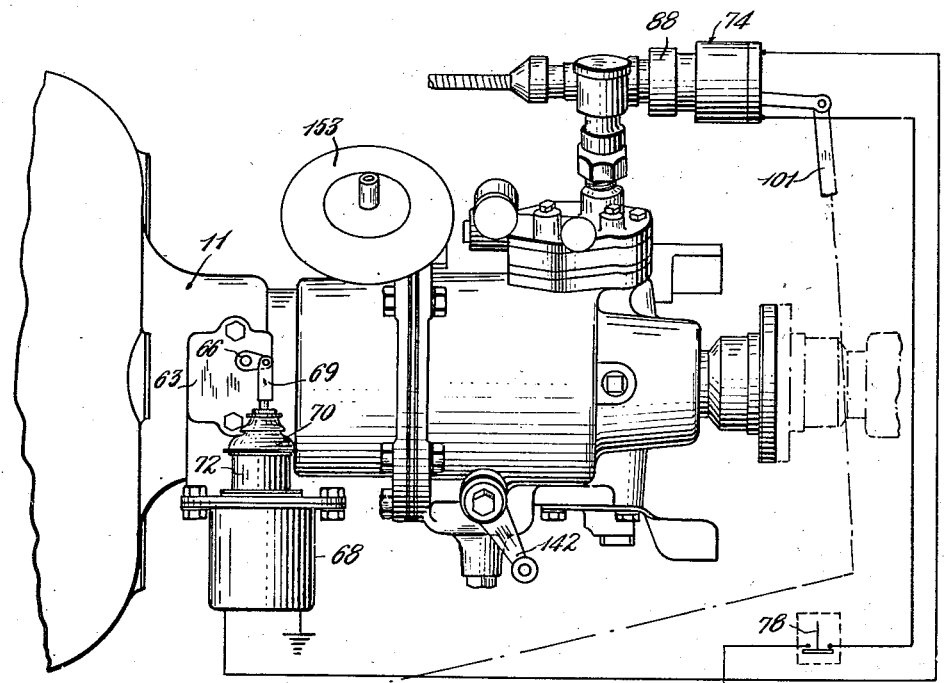
Fig. 2 is a diagrammatic view showing the control system for the power transmitting apparatus shown in Fig. 1.
Figure 2:
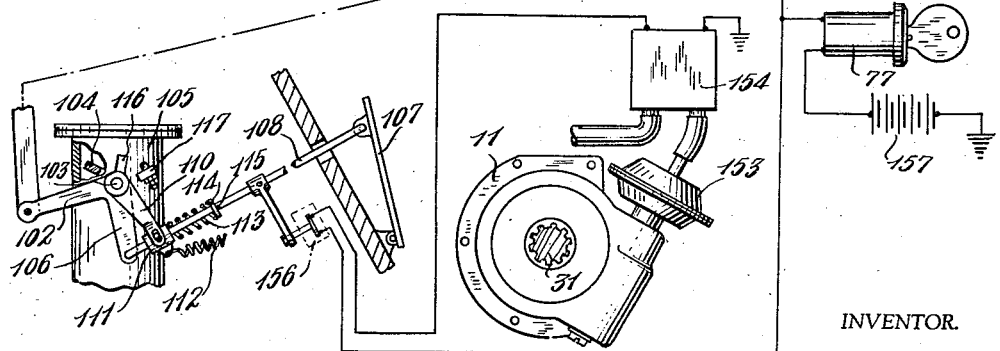

As shown, the shaft 103, which as previously stated, carries the butterfly valve 104 of the carburetor 105 is provided with a lever 110 fixed thereon and pivotally connected to a member 111 slidable upon the rod 108. The lever 110 is continuously urged in a counterclockwise direction as viewed in Fig. 2 by a tension spring 112 connected to the member 111 and to a fixed part of the vehicle. Movement of the member 111 along the rod 108 in a direction opposite to that in which the rod 108 is moved when the accelerator 107 is depressed is resisted by a compression spring 113 interposed therebetween and a washer 114, the movement of which along the rod 108 is limited by a pin 115. The compression spring 113 is considerably stronger than the tension spring 112. The relative strength of the springs is preferably such that the bell crank lever comprising the arms 102 and 106 and the lever 110 connected to the butterfly valve of the carburetor move as a unit until the projection 116 on the lever 110 engages the adjustable stop 117 representing the full open position of the butterfly valve 104. After the projection 116 engages the stop 117, the bell crank lever alone moves upon the accelerator pedal 107 being further depressed. The construction is such that as the accelerator pedal 107 is depressed, the tension of the spring 98 is increased, thus raising the speed of the vehicle at which the hydraulic transmission changes from a fluid torque converter to a fluid coupling and vice versa. As a matter of fact, the change from fluid torque converter to fluid coupling can be entirely prevented by holding the accelerator pedal 107 fully depressed.

The rear end of the driven shaft 31 projects through a partition 120 in the transmission case 11 and just to the rear of the partition it is provided with a beveled side gear 121 splined thereto. The beveled side gear 121 forms a part of the differential gear transmission J previously mentioned which provides the reverse gear for the vehicle. The beveled gear 121 is continuously in mesh with a pair of beveled gears 122 and 123 rotatably supported on a spider member 124 which in turn is rotatably supported on a reduced portion 125 of the driven shaft 31. The beveled gears 122 and 123 are continuously in mesh with a second beveled side gear 93, previously mentioned, also rotatably supported on the reduced portion 125 of the driven shaft 31, and provided with an elongated hub 92 rotatably supported in the transmission case 11 by an anti-friction bearing 126. A coupler member 127 splined to the hub 92 of the beveled side gear provides means for connecting the same to a driven shaft 128 which as shown is the propeller or drive shaft of the vehicle but which, if desired, may lead to a supplemental speed change transmission or other mechanism interposed in the drive to the road wheels of the vehicle.

Opposite ends of the spider member 124 which carries the beveled gears 122 and 123 project beyond the gears and engage within elongated slots 129 and 130 in the prongs of a U-shaped yoke member 131 slidably supported on the hub of the beveled side gear 121. The member 131 is provided with internal gear teeth 132 formed on the left-hand end thereof adapted to be engaged either with external teeth 133 on the hub of the beveled side gear 121 or external teeth 134 on a member 135 fixed in the partition 120, or positioned in the open space intermediate the teeth 133 and 134. The yoke member 131 is adapted to be shifted from one to the other of its three positions by an arm 136 fixed to a shaft 137 slidably supported in the transmission case 11. The shaft 137 is adapted to be moved longitudinally to shift the yoke member 131 from one position to another, by a manually controlled mechanism of any suitable design. As shown, the shaft 137 is moved longitudinally by a crank pin 138 fixed to a crank arm 139 carried by a short shaft 140 rotatably supported in the transmission shaft. The crank pin 138 engages in a slot formed by two projections 141 on the member 136 and the external end of the shaft 140 is provided with an arm 142 through the medium of which it is connected to a lever or the like, not shown, but located within convenient reach of the operator of the vehicle and connected to the lever 142 in a conventional manner.

A spring-pressed detent 143 adapted to engage within one or the other of three depressions 144 in the member 136, only one of which is shown in the drawings, provides means for holding the yoke member 131 in one or the other of its three positions. When the internal teeth 132 of the yoke member 131 are meshed with the external teeth 133 of the beveled side gear 121, the spider member 124 is fixed with respect to the beveled side gear 121 and the differential gear transmission J operates as a unit, with the result that a direct drive is effected between the shafts 31 and 128. When the internal gear teeth 132 on the yoke member 131 are meshed with the external teeth 134 on the member 135 the spider member 124 is held stationary with respect to the transmission case 11, with the result that the shaft 128 is rotated at the same speed as the shaft 31 but in a reverse direction. When the internal teeth 132 are intermediate the teeth 133 and 134, that is in the neutral position, the yoke member 131 and the spider member 124 are free to rotate, in which case it is impossible to transmit power from the shaft 31 to the shaft 128.

When the vehicle is at rest with the motor idling, it is desirable to disconnect the drive to the road wheels in some manner so as to eliminate any tendency of the vehicle to creep forward. It is also desirable to disconnect the drive while shifting the yoke member 131. In the preferred embodiment shown, this is accomplished by releasing the sun gear 41 and the tubular shaft 28, in other words, by permitting these parts which are normally held against reverse rotation by the overrunning clutch 40 to rotate freely in the reverse direction. As previously described the sleeve-like member 34 is rotatably supported within the transmission case 11 by means including the coil-type selective overrunning brake F known in the art as a clutch. This brake or clutch comprises a resilient coil member 145 interposed between the sleeve 134 and an internal cylindrical member 146 fixed to the partition 120 of the transmission case 11. The front end of the resilient coil member 145 abuts against a shoulder or projection 147 on the member 146 which prevents rotation thereof. The rear end of the resilient coil member 145 is bent at right angles to the convolutions thereof to form a longitudinally extending projection 148, see Fig. 9, and this projection is used in a manner presently to be described.

Figure 9:
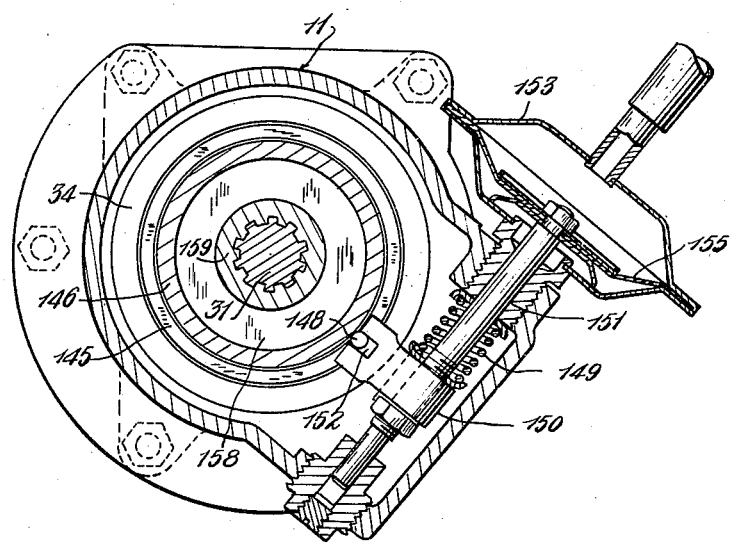
Fig. 9 is a sectional view, with portions in elevation, approximately on the line 9—9 of Fig. 3.
Figure 10:
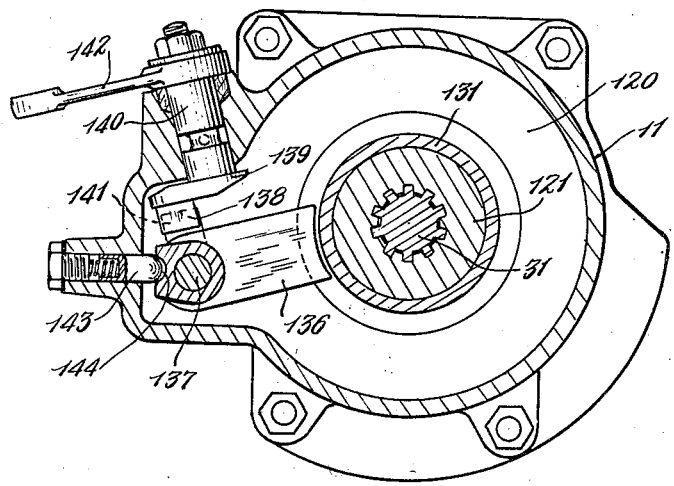
Fig. 10 is a sectional view, with portions in elevation, approximately on the line 10—10 of Fig. 3.
Figure 11:
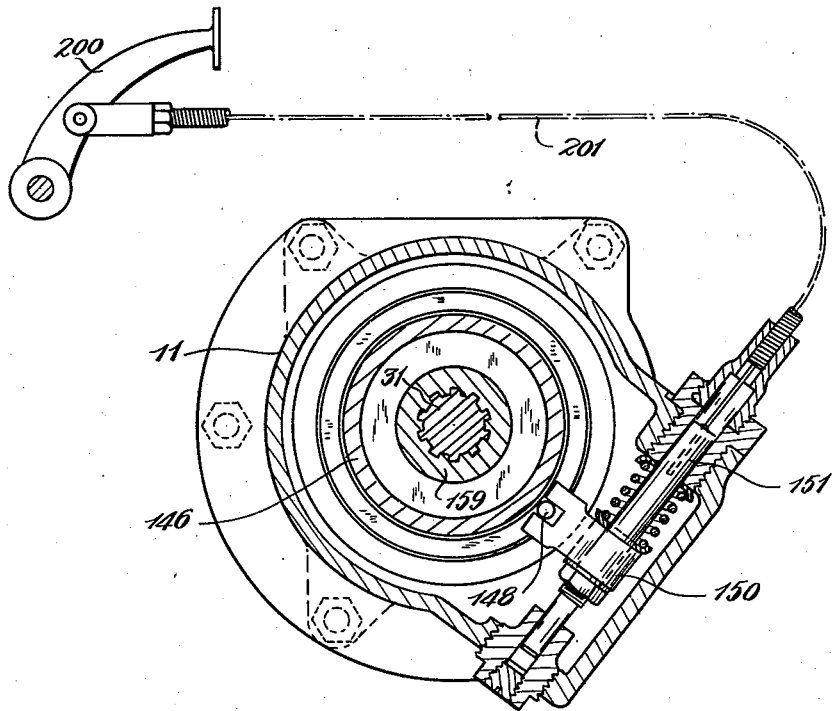
Fig. 11 is a view similar to Fig. 9 but illustrating an alternative construction.
Figure 12:
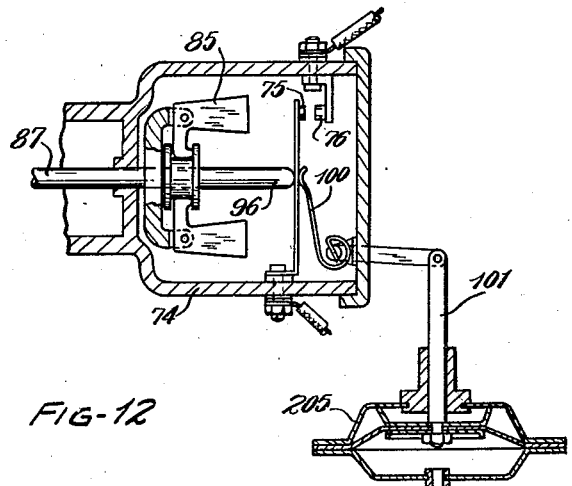
Fig. 12 is a view similar to Fig. 7 but illustrating an alternative construction.

The resilient coil member is normally expanded to engage the interior of the sleeve member 34 by a compression spring 149, see Fig. 9, interposed between a part of the transmission case 11 and a yoke member 150 carried by a rod 151 which yoke member has a slot 152 in its projecting free end that engages over the projection 148 of the resilient coil member 145. This holds the member 34 against rotation in a counterclockwise direction as viewed from the front of the vehicle. The rod 151 is slidably supported in the transmission case 11 and the rear end of the resilient coil member 145 is moved in the reverse direction to contract the same and release the sleeve member 34 by a vacuum motor 153 operatively connected to and disconnected from the intake manifold of the internal combustion engine by a solenoid-operated valve 154. The rod 151 is connected to the piston 155 of the vacuum motor 153 in a conventional way. The solenoid-operated valve 154 is normally deenergized and the vacuum motor 153 disconnected from the intake manifold. This allows the compression spring 149 to hold the resilient coil member 145 expanded into engagement with the sleeve member 34, thus preventing rotation of the sleeve member and in turn the tubular shaft 28 and the sun gear 41 in a counterclockwise direction as viewed from the front of the vehicle. Energization of the solenoid-operated valve is preferably controlled by a switch 156 operatively connected to the accelerator pedal 107 or throttle mechanism of the vehicle in such a manner that the contacts of the switch are closed when the accelerator pedal is entirely released. The construction is preferably such that the switch contacts open upon initial movement of the accelerator pedal 107 and before the throttle or butterfly valve 104 of the carburetor is moved thereby. If necessary a lost motion connection can be interposed between the accelerator pedal and the butterfly valve of the carburetor to accomplish this purpose. The solenoid-operated valve 154 is preferably also connected in series circuit with the ignition switch 77 so that the solenoid will not be energized when the vehicle is at rest with the engine stopped. The source of electrical energy for operating the various electric solenoids, etc. referred to is the conventional automobile battery designated in Fig. 2 by the reference character 157. One side of the circuit is grounded as is the usual practice.

From the foregoing it will be apparent that when the engine is idling the sleeve 34 and in turn the tubular shaft 28 and the sun gear 41 will be free to rotate in a counterclockwise direction as viewed from the front, thus removing any tendency of the vehicle to creep forward and making it easy to shift gears. If desired the automatic mechanism described for releasing the sun gear 41, etc., including the vacuum motor 153 and the solenoid-operated valve 154, etc., can be dispensed with and the rod 151 operated to control the resilient coil member 145 and release the sleeve 34 by a conventional clutch pedal 200 or other suitable mechanism operatively connected thereto in any desired manner as by a Bowden wire 201. It will also be apparent that, if desired, a clutch of a construction different from that shown can be substituted for the overrunning clutch F, for example, a device similar to the roller clutch H or a conventional band brake.

Oil is prevented from escaping from the front part of the transmission case 11 which houses the fluid transmission and the planetary gear transmission E connected therewith to the rear part of the transmission case which houses the reverse drive planetary gear transmission J and vice versa by oil retainers 158 of conventional construction interposed between the interior of the member 146 and a sleeve 159 keyed to the driven shaft 31.

From the foregoing description, the operation of the preferred embodiment of the invention will be apparent. Suffice it to say that the hydraulic transmission shown may be operated either as a fluid torque converter or as a fluid coupling by connecting or disconnecting the tubular shaft 28 with the impeller wheel driving member. While this change may be effected manually, it is preferably accomplished automatically in response to a predetermined speed or speeds of the driven shaft or vehicle. As shown, when the vehicle reaches a predetermined speed, a circuit is completed through a governor switch to an electric solenoid which, when energized, shifts the locking device for the overrunning clutch H to connect tubular shaft 28 with the impeller wheel. A reversal of torque is automatically effected, otherwise the change cannot take place. The tubular shaft 28 is normally prevented from rotating in a reverse direction, that is in a direction opposite to that in which the impeller wheel rotates, by the devices 40 and F. However, when the vehicle is at rest or substantially at rest with the engine idling and the accelerator released, a circuit is established through the solenoid valve 154 by the switch 156, which valve connects the fluid motor 153 with the intake manifold of the engine, releasing the sleeve 34 and thereby interrupting the drive between the crank shaft 15 or engine and the driven shaft 31, thus permitting the speed change transmission J to be shifted. It will also be apparent from the foregoing description that the objects of the invention heretofore enumerated and others have been accomplished and that there has been provided a novel and improved power transmitting mechanism particularly suited to the conditions of operation encountered in motor-driven vehicles, as well as a novel and improved motor-driven vehicle the operation of which will be superior to that of vehicles heretofore known.

Although the preferred embodiment of the invention has been herein shown and described in considerable detail, it is to be understood that in most respects the particular construction shown can be varied within the scope of this invention. For example, instead of varying the speed at which the governor switch contacts close by directly connecting the shaft 100 which carries the spring 97 with the accelerator pedal, the shaft might be connected to a fluid pressure motor 205 connected to the intake manifold of the engine by a tube 206. Alternatively, the stationary contact 76 may be moved in response to the movement of the throttle or the condition existing in the intake manifold which after all is a function of the opening of the throttle.

Having thus described my invention what I claim is:

1. A power transmitting device comprising a driving member, a driven member, a variable speed transmission device of the vane wheel type including an impeller wheel comprising a series of vanes, a turbine wheel comprising a series of vanes, a third vane wheel having a series of vanes adapted to act as reaction vanes, means for operatively connecting said impeller wheel with said driving member, means for operatively connecting said turbine wheel with said driven member, means for rotatably supporting said third vane wheel, means for preventing rotation of said third vane wheel in a direction opposite to the direction of rotation of said impeller wheel, means for operatively connecting said third vane wheel with said driving member temporarily in which event it acts as an impeller, means for actuating said last-named means, and automatic means operable in timed relation to the actuation of the last-named means for causing a substantially instantaneous reversal of torque between said driving and said driven members.

2. A power transmitting device comprising a driving member, a driven member, a variable speed transmission device of the vane wheel type including an impeller wheel comprising a series of vanes, a turbine wheel comprising a series of vanes, a third vane wheel having a series of vanes adapted to act as reaction vanes, means for operatively connecting said impeller wheel with said driving member, means for operatively connecting said turbine wheel with said driven member, means for rotatably supporting said third vane wheel, means for preventing rotation of said third vane wheel in a direction opposite to that of said impeller wheel, means for operatively connecting said third vane wheel with said driving member whereby it acts as an impeller while so connected, means including mechanism responsive to the speed of one of said members for actuating said last-named means to operatively connect said third vane wheel with said member when the speed of said driven member exceeds a predetermined amount, and means automatically operable to effect a reversal of torque between said driving and said driven members upon actuation of said last-named means.

3. A power transmitting device comprising a driving member, a driven member, a variable speed transmission device of the vane wheel type including an impeller wheel comprising a series of vanes, a turbine wheel comprising a series of vanes, a third vane wheel having a series of vanes adapted to act as reaction vanes, means for operatively connecting said impeller wheel with said driving member, means for operatively connecting said turbine wheel with said driven member, means for rotatably supporting said third vane wheel, means for preventing rotation of said third vane wheel in a direction opposite to the direction of rotation of said impeller wheel, means for operatively connecting said third vane wheel with said driving member whereby it acts as an impeller while so connected, means including mechanism responsive to the speed of one of said members for actuating said last-named means to operatively connect said third vane wheel with said driving member upon said driven member reaching a predetermined speed, means for preventing the operation of said last-named means while torque is being transmitted from said driving to said driven means, and means operable in timed relation to the actuation of the fifth-named means for causing a substantially instantaneous reversal of torque between said driving and said driven members.

4. A power transmitting device comprising a driving member, a driven member, a variable speed transmission device of the vane wheel type including an impeller wheel comprising a series of vanes, a turbine wheel comprising a series of vanes, a third vane wheel having a series of vanes adapted to act as reaction vanes, means for operatively connecting said impeller wheel with said driving member, means for operatively connecting said turbine wheel with said driven member, means for rotatably supporting said third vane wheel, means for preventing rotation of said third vane wheel in a direction opposite to that of said impeller wheel while permitting free rotation thereof in the opposite direction, means for operatively connecting said third vane wheel with said driving member whereby it acts as an impeller while so connected, means including mechanism responsive to the speed of one of said members for actuating said last-named means to operatively connect said third vane wheel with said driving member when the speed of said driven member exceeds a predetermined amount and to disconnect said third vane wheel from said driving member when the speed of said driven member falls below a predetermined amount, and automatic means operable to effect a reversal of torque between said driving and said driven members upon actuation of said last-named means.

5. A power transmitting device comprising a driving member, a driven member, a variable speed transmission device of the vane wheel type including an impeller wheel comprising a series of vanes, a turbine wheel comprising a series of vanes, a third vane wheel having a series of vanes adapted to act as reaction vanes, means for operatively connecting said impeller wheel with said driving member, means for operatively connecting said turbine wheel with said driven member, means for rotatably supporting said third vane wheel, means for preventing rotation of said third vane wheel in a direction opposite to that of said impeller wheel while permitting free rotation thereof in the opposite direction, means for operatively connecting said third vane wheel with said driving member whereby it acts as an impeller while so connected, means including mechanism responsive to the speed of said driven member for actuating said last-named means to operatively connect said third vane wheel with said driving member when the speed of said driven member exceeds a predetermined amount and to disconnect said third vane wheel from said driving member when the speed of said driven member falls below a predetermined amount, and means automatically operable to effect a reversal of torque between said driving and said driven members upon actuation of said last-named means to connect said third vane wheel with said driving member.

6. A power transmitting device comprising a driving member, a driven member, a variable speed transmission device of the vane wheel type including an impeller wheel comprising a series of vanes, a turbine wheel comprising a series of vanes, a third vane wheel having a series of vanes adapted to act as reaction vanes, means for operatively connecting said impeller wheel with said driving member, means for operatively connecting said turbine wheel with said driven member, means for rotatably supporting said third vane wheel, means for preventing rotation of said third vane wheel in a direction opposite to that of said impeller wheel while permitting free rotation thereof in the opposite direction, means for operatively connecting said third vane wheel with said driving member whereby it acts as an impeller while so connected, means including mechanism responsive to the speed of said driven member for actuating said last-named means to operatively connect said third vane wheel with said driving member when the speed of said driven member exceeds a predetermined amount and to disconnect said third vane wheel from said driving member when the speed of said driven member falls below a predetermined amount, and means automatically operable to effect a reversal of torque between said driving and said driven members upon actuation of said last-named means to disconnect said third vane wheel with said driving member.

7. In a device of the character described, the combination of an internal combustion engine including an ignition system, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel, means for preventing rotation of said third vane wheel in a direction opposite to the direction of rotation of said impeller wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel, and means operable in relation to the actuation of the last-named means for substantially instantaneously deenergizing the ignition system of said internal combustion engine.

8. In a device of the character described, the combination of an internal combustion engine including an ignition system, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel for preventing rotation of said third vane wheel in a direction opposite to the direction of rotation of said impeller wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel, means for preventing the operation of said last-named means while torque is being transmitted from said internal combustion engine to said driven means, and automatic means operable in relation to the actuation of the fourth-named means for substantially instantaneously deenergizing the ignition system of said internal combustion engine.

9. In a device of the character described, the combination of an internal combustion engine including an ignition system, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel, means for preventing rotation of said third vane wheel in a direction opposite to the direction of rotation of said impeller wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel and for disconnecting said third vane wheel with said impeller wheel when the speed of said driven member drops below a predetermined amount, and means operable in timed relation to the actuation of the last-named means for substantially instantaneously deenergizing the ignition system of said internal combustion engine.

10. In a device of the character described, the combination of an internal combustion engine including an ignition system, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel, means for preventing rotation of said third vane wheel in a direction opposite to the normal direction of rotation of said turbine wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel and for disconnecting said third vane wheel with said impeller wheel when the speed of said driven member drops below a predetermined amount, means for preventing the operation of said last-named means while torque is being transmitted from said internal combustion engine to said driven means, and means operable in timed relation to the actuation of the fourth-named means for substantially instantaneously deenergizing the ignition system of said internal combustion engine thereby causing a reversal of torque and rendering said last-named means inoperative.

11. In a device of the character described, the combination of an internal combustion engine including an ignition system and a throttle, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel, means for preventing rotation of said third vane wheel in a direction opposite to the direction of rotation of said impeller wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel, means operable in relation to the actuation of the last-named means for substantially instantaneously deenergizing the ignition system of said internal combustion engine, and means including mechanism responsive to the opening of said throttle of said internal combustion engine for varying the speed at which said fourth named means operates as said throttle is opened.

12. In a device of the character described, the combination of an internal combustion engine including an ignition system and a throttle, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel, means for preventing rotation of said third vane wheel in a direction opposite to the direction of rotation of said impeller wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel, means operable in relation to the actuation of the fourth-named means for substantially instantaneously deenergizing the ignition system of said internal combustion engine, and means including mechanism responsive to the amount said throttle of said internal combustion engine is opened for varying the speed at which said fourth-named means operates as said throttle is opened.

13. In a device of the character described, the combination of an internal combustion engine including an ignition system and a throttle, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel, means for preventing rotation of said third vane wheel in a direction opposite to the direction of rotation of said impeller wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel, means for preventing the operation of said last-named means while torque is being transmitted from said internal combustion engine to said driven means, means operable in relation to the actuation of the fourth-named means for substantially instantaneously deenergizing the ignition system of said internal combustion engine, and means including mechanism operatively connected to said throttle for varying the speed of said driven member at which said fourth-named means operates as said throttle is opened.

14. In a device of the character described, the combination of an internal combustion engine including an ignition system and a throttle, a driven member, an impeller wheel comprising a series of vanes operatively connected to said internal combustion engine, a turbine wheel comprising a series of vanes, a third vane wheel, means for operatively connecting said turbine wheel with said driven member, means for rotatably supporting said third vane wheel, means for preventing rotation of said third vane wheel in a direction opposite to the direction of rotation of said impeller wheel, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel, means for preventing the operation of said last-named means while torque is being transmitted from said internal combustion engine to said driven means, means operable in relation to the actuation of the fourth-named means for substantially instantaneously deenergizing the ignition system of said internal combustion engine, and means including mechanism operatively connected to said throttle for varying the speed of said driven member at which said fourth-mentioned means operates as said throttle is opened.

15. In a device of the character described, the combination of an internal combustion eng'ne including a throttle, a primary wheel comprising a series of vanes, a secondary wheel comprising a series of vanes, means for operatively connecting said primary wheel with said internal combustion engine, a planetary gear train comprising orbit and sun and planet gears, means for operatively connecting said secondary wheel with said orbit gear, means for operatively connecting said planet gears with said driven member, means for rotatably supporting said sun gear, means for preventing rotation of said sun gear in a direction opposite to that of said primary wheel, and means including mechanism operatively connected to said throttle of said internal combustion engine for rendering said last-named means inoperative when said throttle is substantially closed.

16. In a device of the character described, the combination of an internal combustion engine including a throttle, a primary wheel comprising a series of vanes, a secondary wheel comprising a series of vanes, means for operatively connecting said primary wheel with said internal combustion engine, a planetary gear train comprising orbit and sun and planet gears, means for operatively connecting said secondary wheel with said orbit gear, means for operatively connecting said planet gears with said driven member, means for rotatably supporting said sun gear, means for preventing rotation of said sun gear in a direction opposite to that of said primary wheel, and means including mechanism operatively connected to said throttle of said internal combustion engine for rendering said last-named means inoperative to hold said sun gear when said internal combustion engine is idling.

17. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, means for operatively connecting said turbine wheel with said orbit gear, means for operatively connecting said planet gears with said driven member, means for rotatably supporting said third vane wheel, means for preventing rotation of said third vane wheel in a direction opposite to the direction of rotation of said impeller wheel, means for rotatably supporting said sun gear, means for preventing rotation of said sun gear in a direction opposite to that of said impeller wheel, means including mechanism operatively connected to said throttle of said internal combustion engine for rendering said last-named means inoperative when said throttle is substantially closed and said engine is idling, means including mechanism responsive to the speed of said driven member for operatively connecting said third vane wheel with said impeller wheel when the speed of said driven member exceeds a predetermined amount whereby said third vane wheel is thereafter driven as a unit with said impeller wheel, and means automatically operable to effect a reversal of torque between said internal combustion engine and said driven member upon actuation of said last-named means.

18. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, a tubular shaft integral with said sun gear, means for operatively connecting said turbine wheel with said orbit gear, means for operatively connecting said planet gears with said driven member, means for rotatably supporting said tubular shaft, means for preventing rotation of said tubular shaft in a direction opposite to that of said impeller wheel, means including mechanism operatively connected to said throttle of said internal combustion engine for rendering said last-mentioned means inoperative when said throttle is substantially closed and said engine is idling, means for supporting said third vane wheel on said tubular shaft against rotation relative to said tubular shaft in a direction opposite to that of said impeller wheel, means including mechanism responsive to the speed of said driven member for operatively connecting said tubular shaft with said impeller wheel when the speed of said driven member exceeds a predetermined amount whereby said third vane wheel and said sun gear are thereafter driven as a unit with said impeller wheel, and means automatically operable to effect a reversal of torque between said internal combustion engine and said driven member upon actuation of said last-named means.

19. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, means for operatively connecting said turbine wheel with said orbit gear, means for operatively connecting said planet gears with said driven member, means for preventing rotation of said sun gear in a direction opposite to that of said impeller wheel, means including mechanism operatively connected to said throttle of said internal combustion engine for rendering said last-named means inoperative when said throttle is substantially closed and said engine is idling, means for preventing rotation of said third vane wheel relative to said sun gear in a direction opposite to that of said impeller wheel, means including mechanism responsive to the speed of said driven member for operatively connecting said sun gear with said impeller wheel when the speed of said driven member exceeds a predetermined amount whereby said third vane wheel and said sun gear are thereafter driven as a unit with said impeller wheel and for disconnecting said third vane wheel and said sun gear from said impeller wheel when the speed of said driven member falls below a predetermined amount, and means automatically operable to effect a reversal of torque between said internal combustion engine and said driven member upon actuation of said last-named means.

20. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, means for operatively connecting said turbine wheel with said orbit gear, means for operatively connecting said planet gears with said driven member, means for rotatably supporting said sun gear, means for preventing rotation of said sun gear in a direction opposite to that of said impeller wheel, means including mechanism operatively connected to said throttle of said internal combustion engine for rendering said last-named means inoperative when said throttle is substantially closed and said engine is idling, means for preventing rotation of said third vane wheel relative to said sun gear in a direction opposite to that of said impeller wheel while permitting free rotation thereof in the opposite direction, means including mechanism responsive to the speed of said driven member for operatively connecting said sun gear with said impeller wheel when the speed of said driven member exceeds a predetermined amount whereby said third vane wheel and said sun gear are thereafter driven as a unit with said impeller wheel and for disconnecting said third vane wheel and said sun gear from said impeller wheel when the speed of said driven member falls below a predetermined amount, means for preventing the operation of said last-named means while torque is being transmitted from said internal combustion engine to said driven means, and means automatically operable to effect a reversal of torque between said internal combustion engine and said driven member upon actuation of said second last-named means.

21. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, means for operatively connecting said turbine wheel with said orbit gear, means for operatively connecting said planet gears with said driven member, means for rotatably supporting said sun gear, means for preventing rotation of said sun gear in a direction opposite to that of said impeller wheel, means including mechanism operatively connected to said throttle of said internal combustion engine for rendering said last-named means inoperative when said throttle is substantially closed and said engine is idling, means for preventing rotation of said third vane wheel relative to said sun gear in a direction opposite to that of said impeller wheel while permitting free rotation thereof in the opposite direction, means including mechanism responsive to the speed of said driven member for operatively connecting said sun gear with said impeller wheel when the speed of said driven member exceeds a predetermined amount whereby said third vane wheel and said sun gear are thereafter driven as a unit with said impeller wheel and for disconnecting said third vane wheel and said sun gear from said impeller wheel when the speed of said driven member falls below a predetermined amount, means for preventing the operation of said last-named means while torque is being transmitted from said internal combustion engine to said driven means, and means automatically operable in timed relation to the actuation of said second last-named means for substantially instantaneously deenergizing said ignition system of said internal combustion engine.

22. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, a tubular shaft integral with said sun gear, means for operatively connecting said turbine wheel with said orbit gear, means for operatively connecting said planet gears with said driven member, means for rotatably supporting said tubular shaft, means for preventing rotation of said tubular shaft in a direction opposite to that of said impeller wheel, means including mechanism operatively connected to said throttle of said internal combustion engine for rendering said last-named means inoperative when said throttle is substantially closed and said engine is idling, means for supporting said third vane wheel on said tubular shaft against rotation relative to said tubular shaft in a direction opposite to that of said impeller wheel, means including mechanism responsive to the speed of said driven member for operatively connecting said tubular shaft with said impeller wheel when the speed of said driven member exceeds a predetermined amount whereby said third vane wheel and said sun gear are thereafter driven as a unit with said impeller wheel, means automatically operable to effect a reversal of torque between said internal combustion engine and said driven member upon actuation of said last-named means, and means including mechanism operatively connected to said throttle of said internal combustion engine for varying the speed at which said second last-named means operates as said throttle is opened.

23. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, means for operatively connecting said turbine wheel with said orbit gear, means for operatively connecting said planet gears with said driven member, means for preventing rotation of said sun gear in a direction opposite to that of said impeller wheel, means including mechanism operatively connected to said throttle of said internal combustion engine for rendering said last-named means inoperative when said throttle is substantially closed and said engine is idling, means for preventing rotation of said third vane wheel relative to said sun gear in a direction opposite to that of said impeller wheel, means including mechanism responsive to the speed of said driven member for operatively connecting said sun gear with said impeller wheel when the speed of said driven member exceeds a predetermined amount whereby said third vane wheel and said sun gear are thereafter driven as a unit with said impeller wheel and for disconnecting said third vane wheel and said sun gear from said impeller wheel when the speed of said driven member falls below a predetermined amount, means automatically operable to effect a reversal or torque between said internal combustion engine and said driven member upon actuation of said last-named means, and means including mechanism operatively connected to said throttle of said internal combustion engine for varying the speed at which said second last-named means operates as said throttle is opened and closed.

24. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, means for operatively connecting said turbine wheel with said orbit gear, means for operatively connecting said planet gears with said driven member, means for rotatably supporting said sun gear, means for preventing rotation of said sun gear in a direction opposite to that of said impeller wheel, means including mechanism operatively connected to said throttle of said internal combustion engine for rendering said last-named means inoperative when said throttle is substantially closed and said engine is idling, means for preventing rotation of said third vane wheel relative to said sun gear in a direction opposite to that of said impeller wheel while permitting free rotation thereof in the opposite direction, means including mechanism responsive to the speed of said driven member for operatively connecting said sun gear with said impeller wheel when the speed of said driven member exceeds a predetermined amount whereby said third vane wheel and said sun gear are thereafter driven as a unit with said impeller wheel and for disconnecting said third vane wheel and said sun gear from said impeller wheel when the speed of said driven member falls below a predetermined amount, means for preventing the operation of said last-named means while torque is being transmitted from said internal combustion engine to said driven means, means automatically operable to effect a reversal of torque between said internal combustion engine and said driven member upon actuation of said second last-named means, and means including mechanism operatively connected to said throttle of said internal combustion engine for varying the speed at which said third last-named means operates as said throttle is opened and closed.

25. In a device of the character described, the combination of an internal combustion engine comprising an ignition system and a throttle, a driven member, an impeller wheel comprising a series of vanes, a turbine wheel comprising a series of vanes, a third vane wheel, means for operatively connecting said impeller wheel with said internal combustion engine, a planetary gear train comprising orbit and sun and planet gears, means for operatively connecting said turbine wheel with said orbit gear, means for operatively connecting said planet gears with said driven member, means for rotatably supporting said sun gear, means for preventing rotation of said sun gear in a direction opposite to that of said impeller wheel, means including mechanism operatively connected to said throttle of said internal combustion engine for rendering said last-named means inoperative when said throttle is substantially closed and said engine is idling, means for preventing rotation of said third vane wheel relative to said sun gear in a direction opposite to that of said impeller wheel while permitting free rotation thereof in the opposite direction, means including mechanism responsive to the speed of said driven member for operatively connecting said sun gear with said impeller wheel when the speed of said driven member exceeds a predetermined amount whereby said third vane wheel and said sun gear are thereafter driven as a unit with said impeller wheel and for disconnecting said third vane wheel and said sun gear from said impeller wheel when the speed of said driven member falls below a predetermined amount, means for preventing the operation of said last-named means while the torque is being transmitted from said internal combustion engine to said driven means, means automatically operable in timed relation to the actuation of said second last-named means for substantially instantaneously deenergizing said ignition system of said internal combustion engine, and means including mechanism operatively connected to said throttle of said internal combustion engine for varying the speed at which said third last-named means operates as said throttle is opened and closed.

ROBERT C. RUSSELL.